United States Patent
Liao et al.

(10) Patent No.: US 11,506,962 B2
(45) Date of Patent: Nov. 22, 2022

(54) ILLUMINATION SYSTEM AND PROJECTION DEVICE

(71) Applicant: Coretronic Corporation, Hsin-Chu (TW)

(72) Inventors: Chien-Chung Liao, Hsin-Chu (TW); Hung-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/458,582

(22) Filed: Aug. 27, 2021

(65) Prior Publication Data

US 2022/0132086 A1 Apr. 28, 2022

(30) Foreign Application Priority Data

Oct. 26, 2020 (CN) .......................... 202022398517.4

(51) Int. Cl.
*G03B 21/20* (2006.01)
*H04N 9/31* (2006.01)

(52) U.S. Cl.
CPC ....... *G03B 21/2013* (2013.01); *G03B 21/204* (2013.01); *H04N 9/3105* (2013.01)

(58) Field of Classification Search
CPC .. H04N 9/3105; H04N 9/3158; H04N 9/3111; H04N 9/3161; G03B 21/2013; G03B 21/204; G03B 21/2066; G03B 33/08
See application file for complete search history.

(56) References Cited

U.S. PATENT DOCUMENTS

| | | | | |
|---|---|---|---|---|
| 2018/0299758 | A1* | 10/2018 | Liao | G03B 21/204 |
| 2019/0227418 | A1* | 7/2019 | Chang | G03B 21/142 |
| 2019/0369470 | A1 | 12/2019 | Yang | |
| 2020/0019049 | A1* | 1/2020 | Liu | G03B 21/204 |
| 2020/0089091 | A1* | 3/2020 | Jao | G03B 21/2013 |
| 2020/0159101 | A1* | 5/2020 | Fan | G03B 33/08 |
| 2021/0037222 | A1* | 2/2021 | Huang | G03B 21/204 |

FOREIGN PATENT DOCUMENTS

| | | |
|---|---|---|
| CN | 107515511 | 12/2017 |
| TW | 201839494 | 11/2018 |

\* cited by examiner

*Primary Examiner* — Magda Cruz
(74) *Attorney, Agent, or Firm* — JCIPRNET

(57) ABSTRACT

An illumination system and a projection device are provided. The illumination system includes multiple laser light source units, a light splitting element, a wavelength conversion module, and a filter module. The laser light source units include first and second laser light source units, respectively configured to provide first and second beams. The light splitting element is located on transmission paths of the first and second beams. When the wavelength conversion module rotates synchronously with the filter module, in a first period of time, the first beam is transmitted to the filter module via the light splitting element and then reflected to a wavelength conversion region via a first color filter region of the filter module, and the second beam is transmitted to the wavelength conversion region via the light splitting element. The first and second beams are converted to a converted beam, which is transmitted to the filter module.

20 Claims, 16 Drawing Sheets

ILLUMINATION SYSTEM AND PROJECTION DEVICE

CROSS-REFERENCE TO RELATED APPLICATION

This application claims the priority benefit of China application serial no. 202022398517.4, filed on Oct. 26, 2020. The entirety of the above-mentioned patent application is hereby incorporated by reference herein and made a part of this specification.

BACKGROUND OF THE INVENTION

1. Field of the Invention

The invention relates to an optical module and an optical device, and in particular, to an illumination system and a projection device.

2. Description of Related Art

Recently, a projection device dominated by solid-state lighting such as a light-emitting diode (LED) and a laser diode gradually win a place in the market. Since the laser diode has higher luminous efficiency, in order to break a limitation on a light source of the light-emitting diode, a model with a laser light source as the light source needed by a projector is gradually developed.

Generally speaking, the projection device using the laser source as a light source includes optical modules such as a wavelength conversion module, a filter module, a light valve, a projection lens, and the like. Specifically, the filter module may be disposed on a downstream of the wavelength conversion module, so that predetermined colored light can be filtered out from colored light of different bands from the wavelength conversion module after passing through the filter module, to purify a color and achieve color saturation. Then, these colored lights are modulated by the light valve to form an image beam, and then the image beam is projected to the outside through a projection lens.

However, in the prior art, in order to reduce a system volume and the limitation of the design of an optical path, the light source may only be placed at a position on a specific side of the system, thereby reducing freedom of placing the light source. In this way, with the increase of the number of light sources, the design difficulty of the mechanism configuration in the projection device will also increase. In addition, due to space constraints, the number of light sources is also limited, which is not conducive to application in the model of the projection device with high brightness requirements.

The information disclosed in this BACKGROUND OF THE INVENTION section is only for enhancement of understanding of the background of the described technology and therefore it may contain information that does not form the prior art that is already known to a person of ordinary skill in the art. Further, the information disclosed in the BACKGROUND OF THE INVENTION section does not mean that one or more problems to be resolved by one or more embodiments of the invention was acknowledged by a person of ordinary skill in the art.

SUMMARY OF THE INVENTION

The invention provides an illumination system with a simple structure and freedom of light source setting.

The invention provides a projection device with a simple structure and freedom of light source setting.

Other objectives and advantages of the invention can be further understood from the technical features disclosed by the invention.

In order to achieve one or some or all of the above purposes or other purposes, an embodiment of the invention provides an illumination system. The illumination system includes a plurality of laser light source units, a light splitting element, a wavelength conversion module, and a filter module. The plurality of laser light source units include a first laser light source unit and a second laser light source unit. The first laser light source unit is configured to provide a first beam. The second laser light source unit is configured to provide a second beam. The light splitting element is located on transmission paths of the first beam and the second beam. The wavelength conversion module has a wavelength conversion region and a non-conversion region. The wavelength conversion module is configured to rotate, so that the wavelength conversion region cuts into the transmission paths of the first beam and the second beam in a first period of time, and the non-conversion region cuts into the transmission path of the second beam in a second period of time. The filter module is configured to rotate and has a plurality of color filter regions. When the wavelength conversion module rotates synchronously with the filter module, in the first period of time, the first beam is transmitted to the filter module via the light splitting element, and then is reflected to the wavelength conversion region of the wavelength conversion module via a first color filter region of the plurality of color filter regions, the second beam is transmitted to the wavelength conversion region of the wavelength conversion module via the light splitting element, and the first beam and the second beam are converted into a converted beam via the wavelength conversion region. The converted beam is transmitted to the filter module via the light splitting element.

In order to achieve one or some or all of the above purposes or other purposes, an embodiment of the invention provides a projection device. The projection device includes the above illumination system, a light valve, and a projection lens. The illumination system is configured to provide an illumination beam. The illumination beam includes a first beam, a second beam, and a converted beam. The light valve is disposed on a transmission path of the illumination beam from the illumination system, and is configured to convert the illumination beam into an image beam. The projection lens is disposed on a transmission path of the image beam, and is configured to project the image beam out of the projection device.

Based on the above, the embodiments of the invention have at least one of the following advantages or effects. In the embodiments of the invention, the freedom of light source setting may be improved via the optical path configuration in which the first beam in the first period of time is transmitted to the wavelength conversion module via the filter module. In this way, the number of light sources in the illumination system may be increased, so that the brightness of the system is improved, which is conducive to application in the model of the projection device with high brightness requirements. Moreover, under the above configuration, the first beam and the second beam may be symmetrically incident to the optical elements located on the transmission paths thereof without disposing additional optical elements, thereby improving the optical efficiency of the projection device and the illumination system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
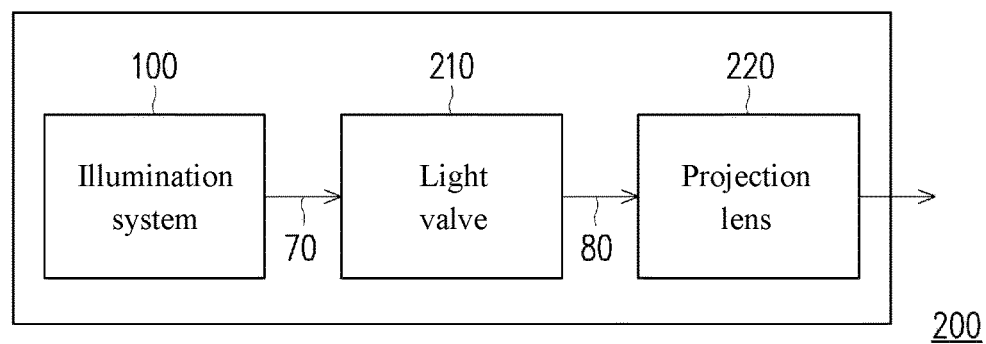
FIG. 1 is a block diagram of a projection device according to an embodiment of the invention.
Figure 2A:
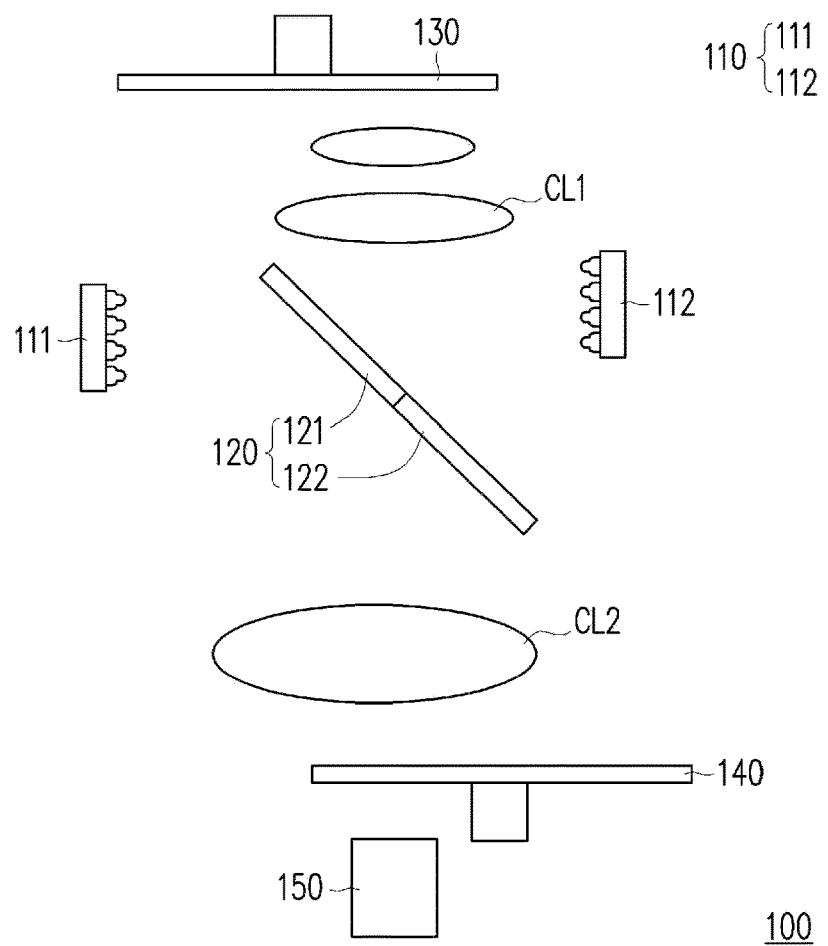
FIG. 2A is a schematic diagram of a configuration of an illumination system of FIG. 1.
Figure 2B:
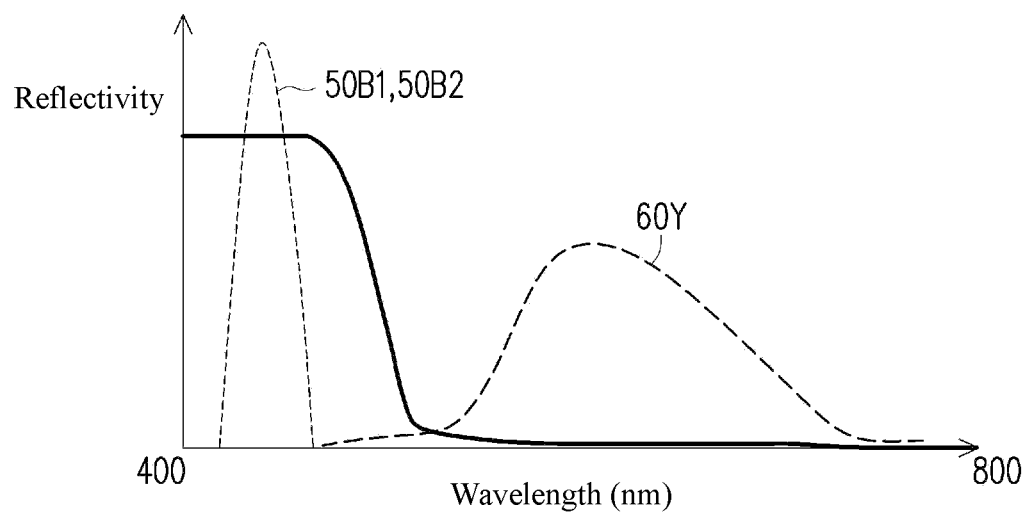
FIG. 2B is a graph showing a relationship between transmittance of a first region of a light splitting element of FIG. 2A and light of different bands.
Figures 2C, 2D:
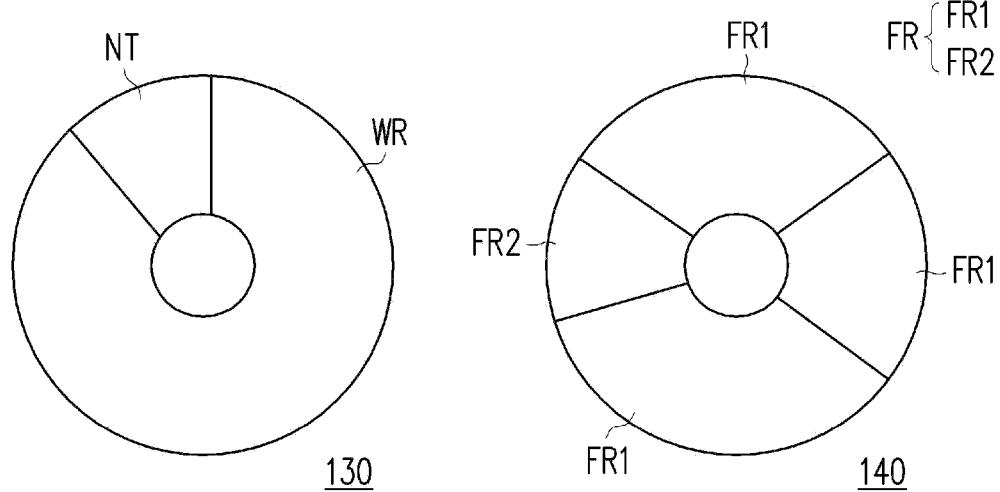
FIG. 2C is a top view of a wavelength conversion module of FIG. 2A.
FIG. 2D is a top view of a filter module of FIG. 2A.
Figure 2E:
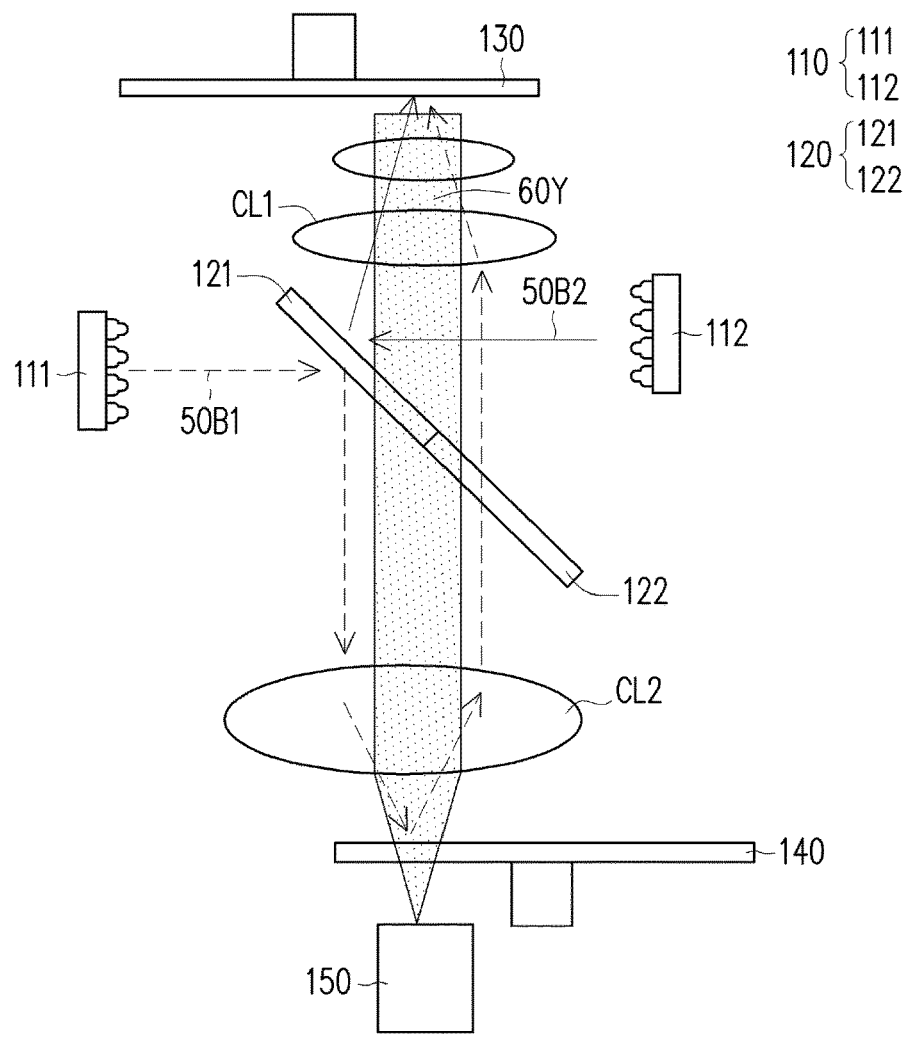
FIG. 2E is a schematic diagram of an optical path of an illumination system of FIG. 2A in a first period of time.
Figures 2F, 2G:
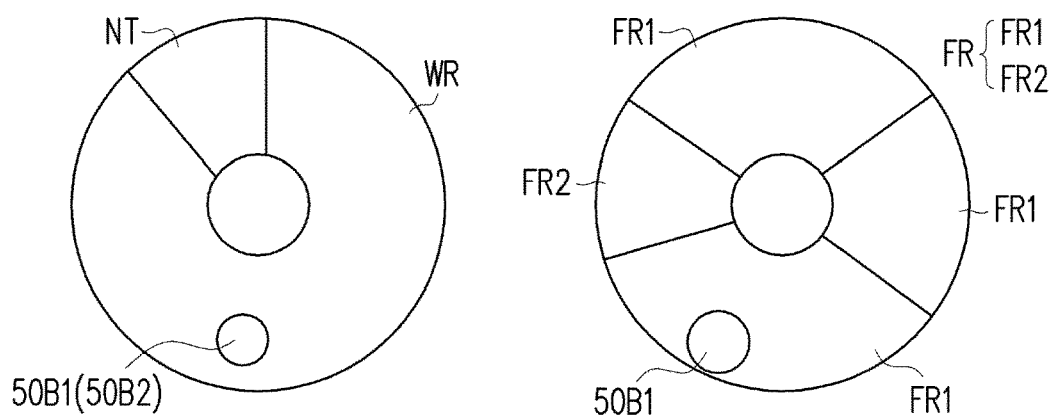
FIG. 2F is a top view of a wavelength conversion module of FIG. 2E.
FIG. 2G is a top view of a filter module of FIG. 2E.
Figure 2H:
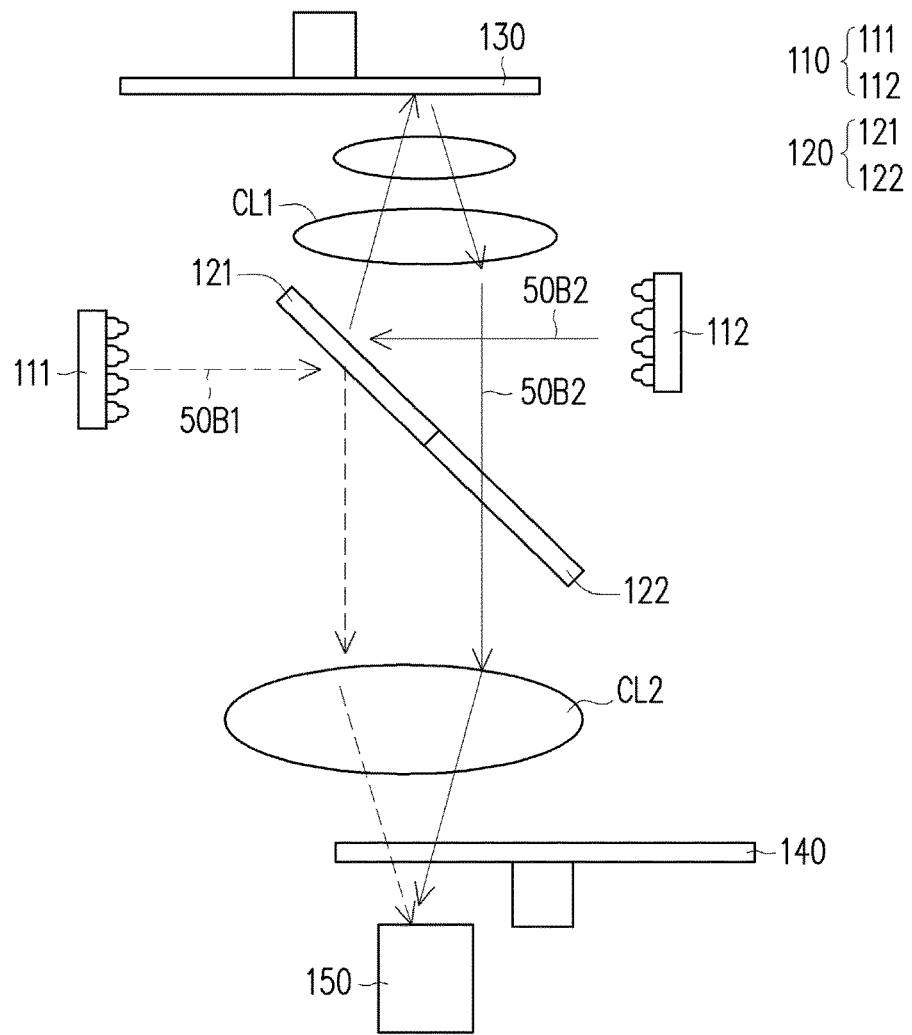
FIG. 2H is a schematic diagram of an optical path of an illumination system of FIG. 2A in a second period of time.
Figures 2I, 2J:
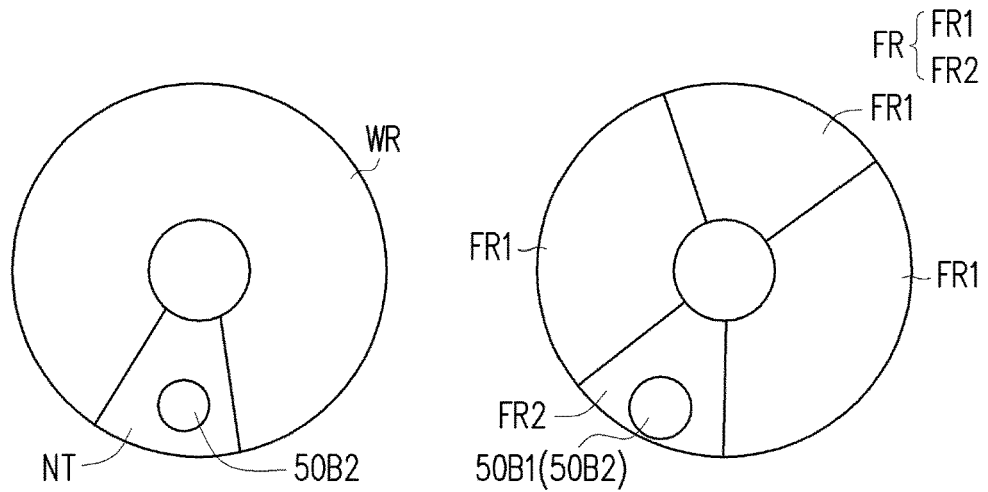
FIG. 2I is a top view of a wavelength conversion module of FIG. 2H.
FIG. 2J is a top view of a filter module of FIG. 2H.

FIG. 1 is a block diagram of a projection device according to an embodiment of the invention. FIG. 2A is a schematic diagram of a configuration of an illumination system of FIG. 1. FIG. 2B is a graph showing a relationship between transmittance of a first region of a light splitting element of FIG. 2A and light of different bands. FIG. 2C is a top view of a wavelength conversion module of FIG. 2A. FIG. 2D is a top view of a filter module of FIG. 2A. FIG. 2E is a schematic diagram of an optical path of an illumination system of FIG. 2A in a first period of time. FIG. 2F is a top view of a wavelength conversion module of FIG. 2E. FIG. 2G is a top view of a filter module of FIG. 2E. FIG. 2H is a schematic diagram of an optical path of an illumination system of FIG. 2A in a second period of time. FIG. 2I is a top view of a wavelength conversion module of FIG. 2H. FIG. 2J is a top view of a filter module of FIG. 2H. Referring to FIG. 1, a projection device 200 includes an illumination system 100, a light valve 210, and a projection lens 220. The illumination system 100 is configured to provide an illumination beam 70. The light valve 210 is disposed on a transmission path of the illumination beam 70 from the illumination system 100, and is configured to convert the illumination beam 70 into an image beam 80. The projection lens 220 is disposed on a transmission path of the image beam 80, and is configured to project the image beam 80 out of the projection device 200. In the embodiment, there is one light valve 210, but the invention is not limited thereto. In other embodiments, there may be a plurality of light valves 210. In addition, in the embodiment, the light valve 210 may be a digital micro-mirror device (DMD) or a liquid-crystalon-silicon panel (LCOS panel). However, in other embodiments, the light valve 210 may also be a transmissive liquid crystal panel or other beam modulators.

Specifically, as shown in FIG. 2A, FIG. 2E, and FIG. 2H, in the embodiment, the illumination system 100 includes a plurality of laser light source units 110, a light splitting element 120, a wavelength conversion module 130, a filter module 140, and a light homogenization element 150. The plurality of laser light source units 110 include a first laser light source unit 111 and a second laser light source unit 112. The first laser light source unit 111 is configured to provide a first beam 50B1. The second laser light source unit 112 is configured to provide a second beam 50B2. For example, in the embodiment, the first beam 50B1 and the second beam 50B2 are blue laser beams, and the first laser light source unit 111 and the second laser light source unit 112 may include a plurality of blue laser diodes arranged in an array, but the invention is not limited thereto.

Specifically, as shown in FIG. 2A, FIG. 2E, and FIG. 2H, in the embodiment, the light splitting element 120 is located on transmission paths of the first beam 50B1 and the second beam 50B2, and the first laser light source unit 111 and the second laser light source unit 112 are located on two sides of the light splitting element 120, respectively. The light splitting element 120 has a first region 121 and a second region 122. For example, the first region 121 and the second region 122 of the light splitting element 120 may be a color separation region and a light-transmitting region, respectively. For example, the first region 121 of the light splitting element 120 may be a dichroic mirror with blue reflection to reflect blue light and allow light other than blue light to penetrate. For example, as shown in FIG. 2B, in the embodiment, the first region 121 of the light splitting element 120 may reflect, for example, light of the light-emitting band within a band range of less than 470 nm, to allow light of the light-emitting band within a band range of more than 470 nm to penetrate. Therefore, the first region 121 of the light splitting element 120 may respectively reflect the blue first beam 50B1 and the second beam 50B2, so that the first beam 50B1 and the second beam 50B2 may be respectively transmitted to the filter module 140 and the wavelength conversion module 130 via the first region 121 of the light splitting element 120. Besides, the second region 122 of the light splitting element 120 may be configured with a light-transmitting sheet or a light-transmitting region (such as air) configured with no element that affects the penetration of light, so that visible light can penetrate.

Specifically, as shown in FIG. 2C, FIG. 2F, and FIG. 2I, in the embodiment, the wavelength conversion module 130 has a wavelength conversion region WR and a non-conversion region NT, where the wavelength conversion module 130 is used for rotation. The wavelength conversion module 130 can rotate around the rotating shaft. In this way, the wavelength conversion region WR may cut into the transmission paths of the first beam 50B1 and the second beam 50B2 in a first period of time, and the non-conversion region NT cuts into a transmission path of the second beam 50B2 in a second period of time. Specifically, at least one wavelength conversion region WR of the wavelength conversion module 130 includes a wavelength conversion layer, and may be configured to convert the first beam 50B1 and the second beam 50B2 to a converted beam 60Y (referring to FIG. 2E). For example, in the embodiment, a wavelength conversion material includes phosphor capable of exciting a yellow beam, so that the converted beam 60Y is yellow light. In addition, at least one non-conversion region NT of the wavelength conversion module 130 includes a reflecting layer. In other words, in the embodiment, at least one non-conversion region NT can reflect the second beam 50B2 and enable the second beam 50B2 to be transmitted to a subsequent optical element.

Furthermore, as shown in FIG. 2E and FIG. 2H, in the embodiment, the illumination system 100 further includes a first condenser lens CL1 and a second condenser lens CL2. The first condenser lens CL1 is located between the light splitting element 120 and the wavelength conversion module 130, so that the first beam 50B1 and the second beam 50B2 can be symmetrically incident to the first condenser lens CL1 respectively from two sides of a central axis of the first condenser lens CL1 in the first period of time, and the first beam 50B1 and the second beam 50B2 can be symmetrically and obliquely incident to the wavelength conversion module 130 respectively from two sides of the central axis of the first condenser lens CL1 in the first period of time. Moreover, the second condenser lens CL2 is located between the light splitting element 120 and the filter module 140, so that the converted beam 60Y from the wavelength conversion module 130 can be incident to the filter module 140 symmetrically in the first period of time, and the first beam 50B1 and the second beam 50B2 can be incident to the second condenser lens CL2 symmetrically from two sides of a central axis of the second condenser lens CL2 in the second period of time, and the first beam 50B1 and the second beam 50B2 can be incident to the filter module 140 symmetrically and obliquely from two sides of the central axis of the second condenser lens CL2 in the second period of time.

In addition, specifically, as shown in FIG. 2D, FIG. 2G, and FIG. 2J, in the embodiment, the filter module 140 has a plurality of color filter regions FR. The filter module 140 is also used for rotation and can rotate around the rotating shaft, so that a first color filter region FR1 of the plurality of color filter regions FR cuts into a transmission path of the first beam 50B1 in the first period of time, and the second color filter region FR2 of the plurality of color filter regions FR cuts into the transmission paths of the first beam 50B1 and the second beam 50B2 in the second period of time. For example, in the embodiment, the first color filter region FR1 and the second color filter region FR2 of the filter module 140 may respectively provide optical effects of reflection or transmission on the passing light according to the requirements of optical path design.

Specifically, as shown in FIG. 2D, FIG. 2G, and FIG. 2J, in the embodiment, the first color filter region FR1 may be a dichroic mirror with blue reflection and that only allows light (such as, green light, yellow light, or red light) with a certain band to penetrate, to reflect blue light and form specific colored light. In addition, in the embodiment, the second color filter region FR2 may be a dichroic mirror that only allows blue light to penetrate, to form a blue light filter region.

With reference to FIG. 2E to FIG. 2J, the optical paths of the illumination system 100 in the first period of time and the second period of time are to be further described.

Specifically, as shown in FIG. 2E to FIG. 2G, in the embodiment, when the wavelength conversion module 130 rotates synchronously with the filter module 140, in the first period of time, the first beam 50B1 is reflected to a wavelength conversion region WR of the wavelength conversion module 130 via a first color filter region FR1 of the plurality of color filter regions FR after being transmitted to the filter module 140 via the light splitting element 120, and the second beam 50B2 is transmitted to the wavelength conversion region WR of the wavelength conversion module 130 via the light splitting element 120. In more detail, as shown in FIG. 2E, in the first period of time, the first beam 50B1 is incident to a first region 121 of the light splitting element 120 and reflected to the filter module 140, and then penetrates a second region 122 of the light splitting element 120 after being reflected via the filter module 140, and then is transmitted to the wavelength conversion module 130. Moreover, in the first period of time, the second beam 50B2 is incident to the first region 121 of the light splitting element 120 and reflected to the wavelength conversion region WR of the wavelength conversion module 130. In addition, as shown in FIG. 2E, the first beam 50B1 and the second beam 50B2 may be transmitted to the wavelength conversion module 130 after being symmetrically incident to the first condenser lens CL1 respectively from two sides of the central axis of the first condenser lens CL1.

In this way, both the first beam 50B1 and the second beam 50B2 may be converted to a converted beam 60Y via the wavelength conversion region WR of the wavelength conversion module 130. Furthermore, as shown in FIG. 2E, since both the first region 121 and the second region 122 of the light splitting element 120 may allow light other than blue light to penetrate, the converted beam 60Y formed in the first period of time may be focused by the second condenser lens CL2 and transmitted to the first color filter region FR1 of the filter module 140 after penetrating the first region 121 and the second region 122 of the light splitting element 120, to form specific different colored light. For example, as shown in FIG. 2G, in the embodiment, the first color filter region FR1 may have filter regions such as a green filter region, a yellow filter region, or a red filter region.

Besides, as shown in FIG. 2H to FIG. 2J, in the second period of time, the first beam 50B1 is transmitted to the filter module 140 via the light splitting element 120, and the second beam 50B2 is reflected to the light splitting element 120 after being transmitted to the non-conversion region NT of the wavelength conversion module 130 via the light splitting element 120, and then is transmitted to the filter module 140 via the light splitting element 120. In more detail, as shown in FIG. 2H, in the second period of time, the first beam 50B1 is incident to the first region 121 of the light splitting element 120 and reflected to a second color filter region FR2 of the filter module 140. In addition, the second beam 50B2 is incident to the first region 121 of the light splitting element 120 and reflected to the non-conversion region NT of the wavelength conversion module 130, then penetrates the light splitting element 120 after being reflected by the non-conversion region NT of the wavelength conversion module 130, and is transmitted to the second color filter region FR2 of the filter module 140. In addition, as shown in FIG. 2H, the first beam 50B1 and the second beam 50B2 may be transmitted to the filter module 140 after being symmetrically incident to the second condenser lens CL2 respectively from two sides of the central axis of the second condenser lens CL2. In other words, in the second period of time of the embodiment, the first beam 50B1 will not be incident to the non-conversion region NT of the wavelength conversion module 130, but will be directly transmitted to the filter module 140, and then the first beam 50B1 and the second beam 50B2 will penetrate the second color filter region FR2 of the plurality of color filter regions FR of the filter module 140.

In this way, through the light splitting element 120, the wavelength conversion module 130, and disposing different color filter regions FR of the filter module 140, in the first period of time, the converted beam 60Y may form specific different colored light. However, in the second period of time, the first beam 50B1 and the second beam 50B2 may form blue colored light, thereby forming an illumination beam 70 with different colors at different time period.

Next, as shown in FIG. 2A, in the embodiment, the light homogenization element 150 is located on a transmission path of the illumination beam 70. In the embodiment, the light homogenization element 150 includes an integrated rod, but the invention is not limited thereto. In more detail, as shown in FIG. 1, when the illumination beam 70 is transmitted to the light homogenization element 150, the light homogenization element 150 may homogenize the illumination beam 70, and then the illumination beam 70 is transmitted to the light valve 210. Then, as shown in FIG. 1 and FIG. 2A, since after the illumination beam 70 converges on the light valve 210, the light valve 210 may sequentially transmit the image beam 80 of different colors formed by the illumination beam 70 to a projection lens 220, an image picture projected by the image beam 80 converted by the light valve 210 can become a color picture.

In addition, the freedom of light source setting in the projection device 200 and the illumination system 100 may be improved through the optical path configuration in which the first beam 50B1 in the first period of time is transmitted to the wavelength conversion module 130 via the filter module 140. In this way, the number of light sources in the illumination system 100 may be increased, so that the brightness of the system is improved, which is conducive to application in the model of the projection device 200 with high brightness requirements. Moreover, under the above configuration, the first beam 50B1 and the second beam 50B2 may be symmetrically incident to the optical elements located on the transmission paths thereof without disposing additional optical elements, thereby improving the optical efficiency of the projection device 200 and the illumination system 100.

Figure 3A:
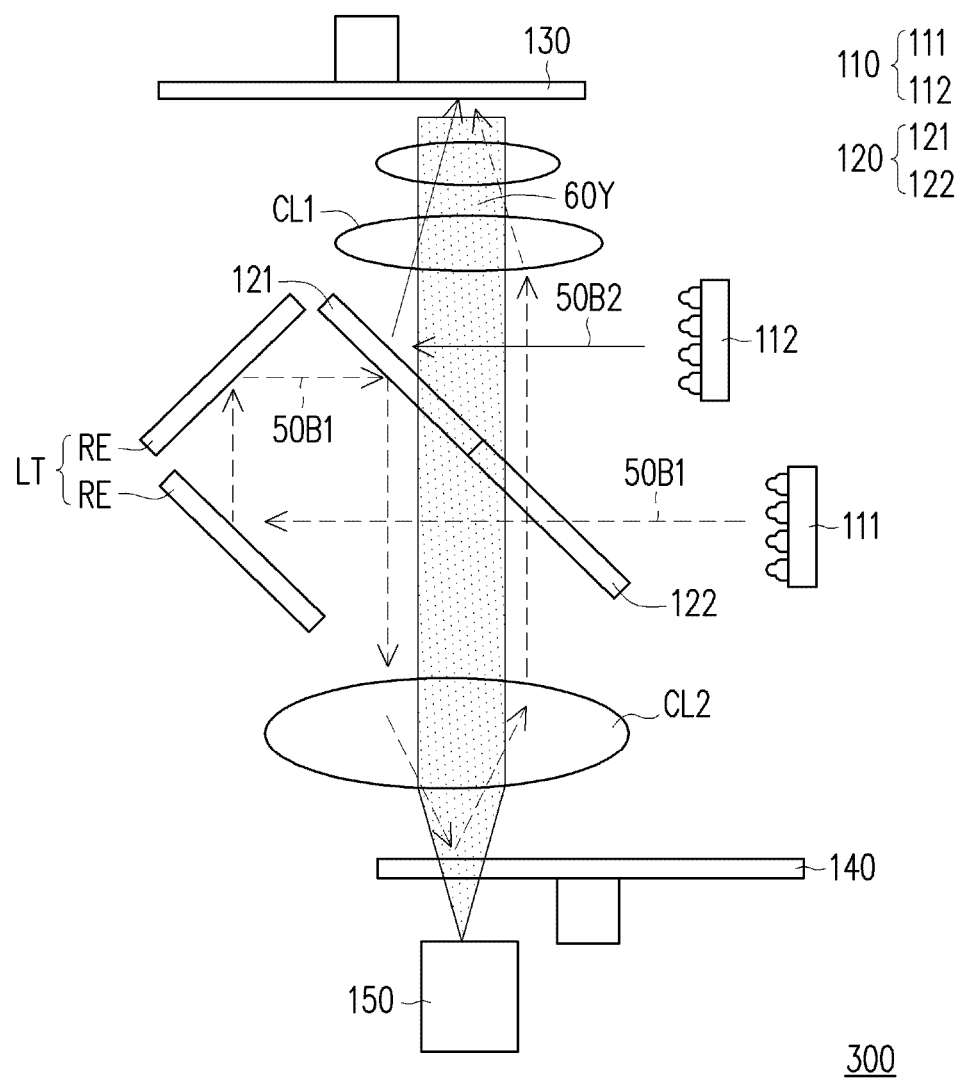
FIG. 3A is a schematic diagram of an optical path of another illumination system of FIG. 1 in a first period of time.
Figure 3B:
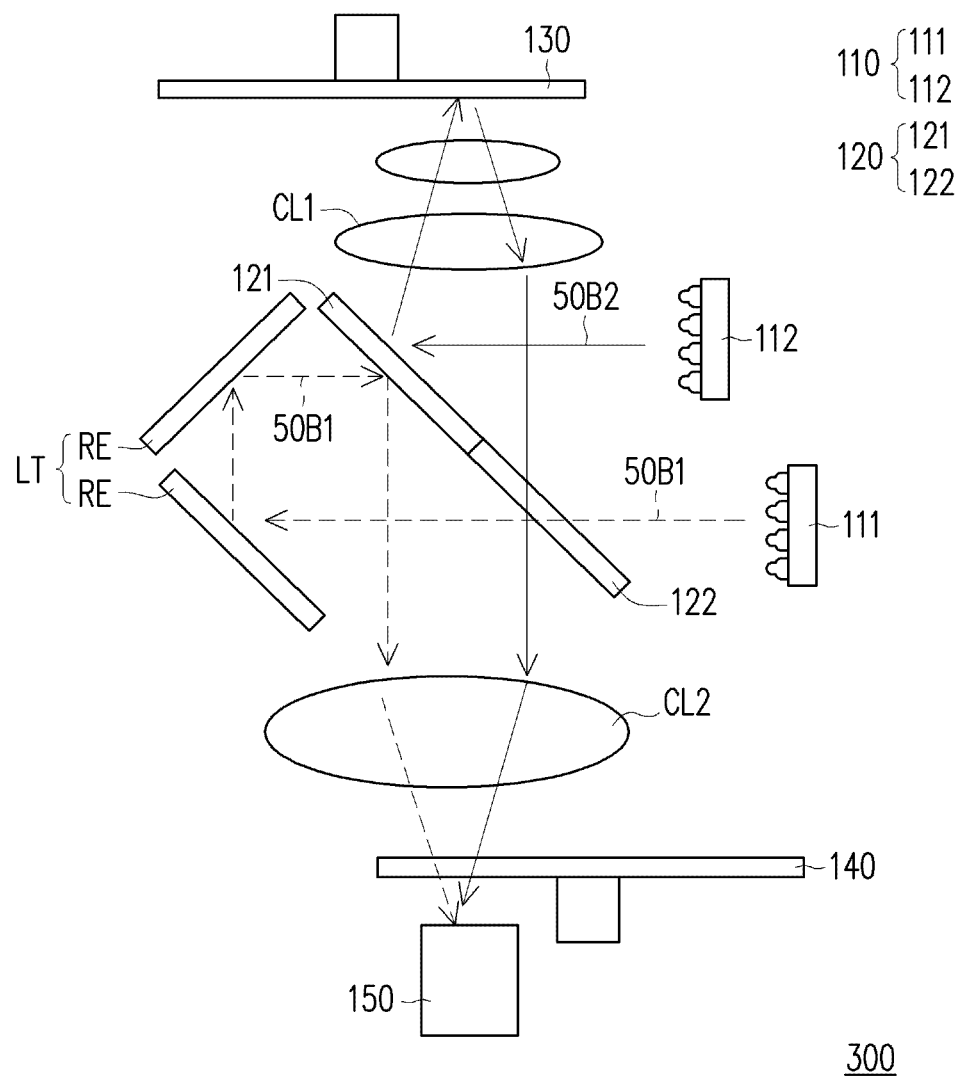
FIG. 3B is a schematic diagram of an optical path of an illumination system of FIG. 3A in a second period of time.

FIG. 3A is a schematic diagram of an optical path of another illumination system of FIG. 1 in a first period of time. FIG. 3B is a schematic diagram of an optical path of an illumination system of FIG. 3A in a second period of time. Referring to FIG. 3A and FIG. 3B, an illumination system 300 of FIG. 3A and FIG. 3B is similar to the illumination system 100 of FIG. 2A, and the difference is described below. In the embodiment, the illumination system 300 further includes a light transmission module LT, and a first laser light source unit 111 and the light transmission module LT are located on two sides of the light splitting element 120, and the first laser light source unit 111 and the second laser light source unit 112 are respectively located on the same side of the light splitting element 120. In more detail, as shown in FIG. 3A and FIG. 3B, the light transmission module LT is located on a transmission path of a first beam 50B1. For example, in the embodiment, the light transmission module LT includes a plurality of reflecting elements RE. In this way, as shown in FIG. 3A and FIG. 3B, in the first period of time and the second period of time, the first beam 50B1 is transmitted to one of the reflecting elements RE of the light transmission module LT after being incident to and penetrates a second region 122 of the light splitting element 120, and then is incident to the first region 121 of the light splitting element 120 via the other of the reflecting elements RE of the light transmission module LT.

Furthermore, in the embodiment, the transmission path of the first beam 50B1 after being transmitted via the light transmission module LT and incident to the first region 121 of the light splitting element 120 is the same as the optical path of the first beam 50B1 in the embodiment of FIG. 2A, and the transmission path of the second beam 50B2 is the same as the optical path of the second beam 50B2 in the embodiment of FIG. 2A. For related details, reference is made to the foregoing descriptions, and the descriptions thereof are omitted herein.

In addition, as shown in FIG. 3A and FIG. 3B, in the embodiment, the reflecting element RE of the light transmission module LT is disposed in a region other than a projection region of the light splitting element 120 on the filter module 140. In this way, the first beam 50B1 or the second beam 50B2 transmitted from the light splitting element 120 to the filter module 140 may be prevented from being blocked by the reflecting element RE of the light transmission module LT.

In this way, in the embodiment, through disposing the light splitting element 120, the wavelength conversion module 130, and different color filter regions FR of the filter module 140, in the first period of time, the first beam 50B1 and the second beam 50B2 are converted to the converted beam 60Y, the illumination system 300 may still allow the converted beam 60Y to form specific different colored light, and in the second period of time, allow the first beam 50B1 and the second beam 50B2 to form blue colored light, thereby forming an illumination beam 70 with different colors, so that similar effects and advantages of the illumination system 100 can be achieved, and the descriptions thereof are omitted herein. In addition, when the illumination system 300 is applied to the projection device 200 of FIG. 1, through the optical path configuration in which the first beam 50B1 of the illumination system 300 in the first period of time is transmitted to the wavelength conversion module 130 via the filter module 140, the freedom of light source setting and the brightness of the system may be improved via the projection device 200, and the first beam 50B1 may be symmetrically incident to the optical elements located on the transmission path thereof, so that the above effects and advantages may also be achieved via the projection device 200, and the descriptions thereof are omitted herein. Moreover, in the embodiment, the configuration manner of the illumination system 300 in which the first laser light source unit 111 and the second laser light source unit 112 are located on the same side is beneficial to the arrangement of heat dissipation elements and the design of heat flow direction.

Figure 4A:
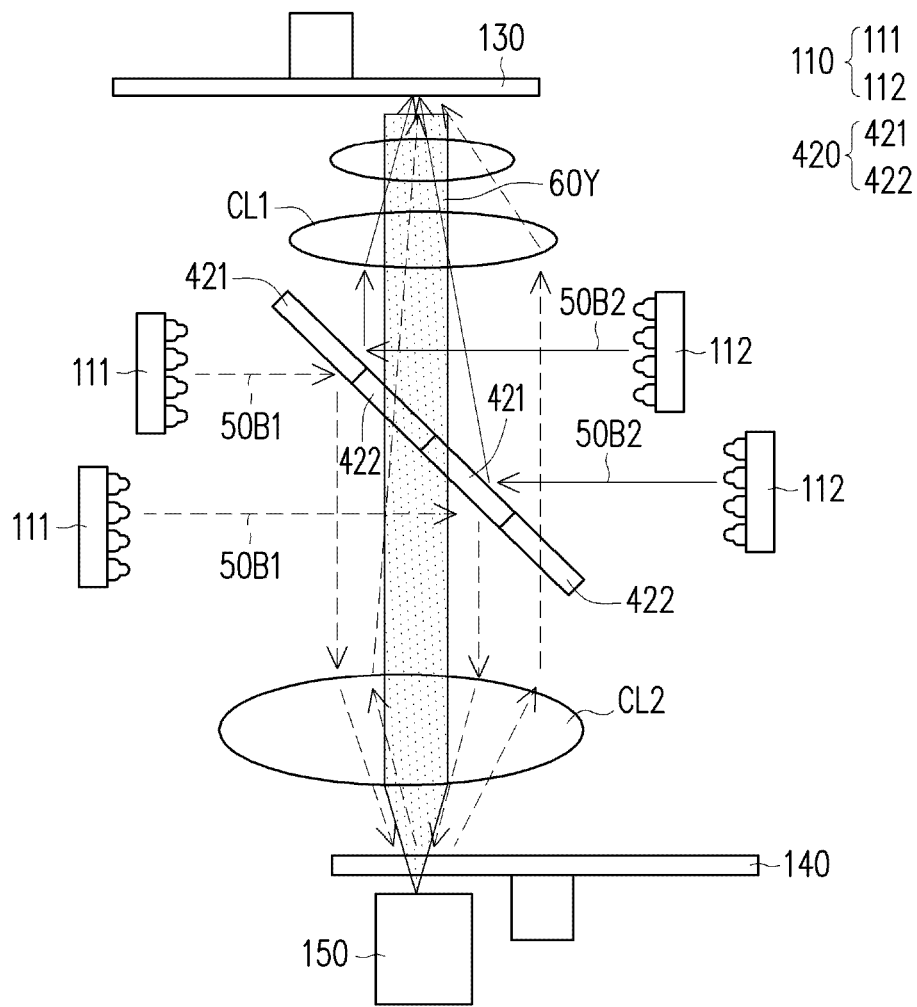
FIG. 4A is a schematic diagram of an optical path of yet another illumination system of FIG. 1 in a first period of time.
Figure 4B:
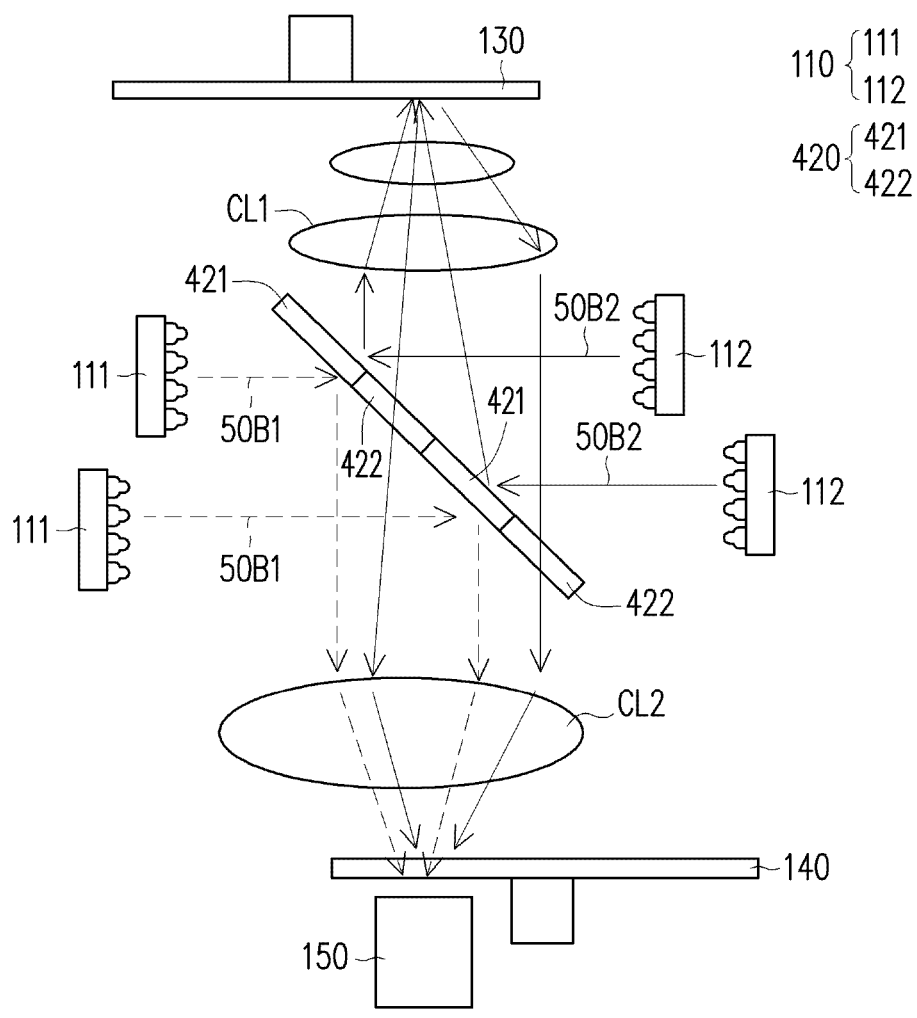
FIG. 4B is a schematic diagram of an optical path of an illumination system of FIG. 4A in a second period of time.

FIG. 4A is a schematic diagram of an optical path of yet another illumination system of FIG. 1 in a first period of time. FIG. 4B is a schematic diagram of an optical path of an illumination system 400 of FIG. 4A in a second period of time. Referring to FIG. 4A and FIG. 4B, an illumination system 400 of FIG. 4A and FIG. 4B is similar to the illumination system 100 of FIG. 2A, and the difference is described below. In the embodiment, there are a plurality of first laser light source units 111 and a plurality of second laser light source units 112 of the illumination system 400, and the light splitting element 420 has a plurality of first regions 421 and a plurality of second regions 422 arranged alternatively with each other. Any of the second regions 422 is located between adjacent two first regions 421, and the plurality of first regions 421 are respectively disposed corresponding to positions of the first laser light source units 111 and the second laser light source units 112. In more detail, as shown in FIG. 4A and FIG. 4B, the first beams 50B1 provided by different first laser light source units 111 need to be incident to different first regions 421 correspondingly, and the second beams 50B2 provided by different second laser light source units 112 also need to be incident to different first regions 421 correspondingly. Therefore, in the embodiment, the number of first regions 421 may be the same as the number of first laser light source units 111/the second laser light source units 112.

Furthermore, in the embodiment, the transmission path of the first beam 50B1 is approximately the same as an optical path sequence of the relevant optical elements through which the first beam 50B1 passes in the embodiment of FIG. 2A, and the transmission path of the second beam 50B2 is approximately the same as an optical path sequence of the relevant optical elements through which the second beam 50B2 passes in the embodiment of FIG. 2A. For related details, reference is made to the foregoing descriptions, and the descriptions thereof are omitted herein.

In this way, in the embodiment, through disposing the light splitting element 420, the wavelength conversion module 130, and different color filter regions FR of the filter module 140, in the first period of time, the first beam 50B1 and the second beam 50B2 are converted to the converted beam 60Y, the illumination system 400 may still allow the converted beam 60Y to form specific different colored light, and in the second period of time, allow the first beam 50B1 and the second beam 50B2 to form blue colored light, thereby forming an illumination beam 70 with different colors, so that similar effects and advantages of the illumination system 100 can be achieved, and the descriptions thereof are omitted herein. In addition, when the illumination system 400 is applied to the projection device 200 of FIG. 1, through the optical path configuration in which the first beam 50B1 of the illumination system 400 in the first period of time is transmitted to the wavelength conversion module 130 via the filter module 140, the freedom of light source setting and the brightness of the system may be improved via the projection device 200, and the first beam may be symmetrically incident to the optical elements located on the transmission path thereof, so that the above effects and advantages may also be achieved via the projection device 200, and the descriptions thereof are omitted herein.

Figure 5A:
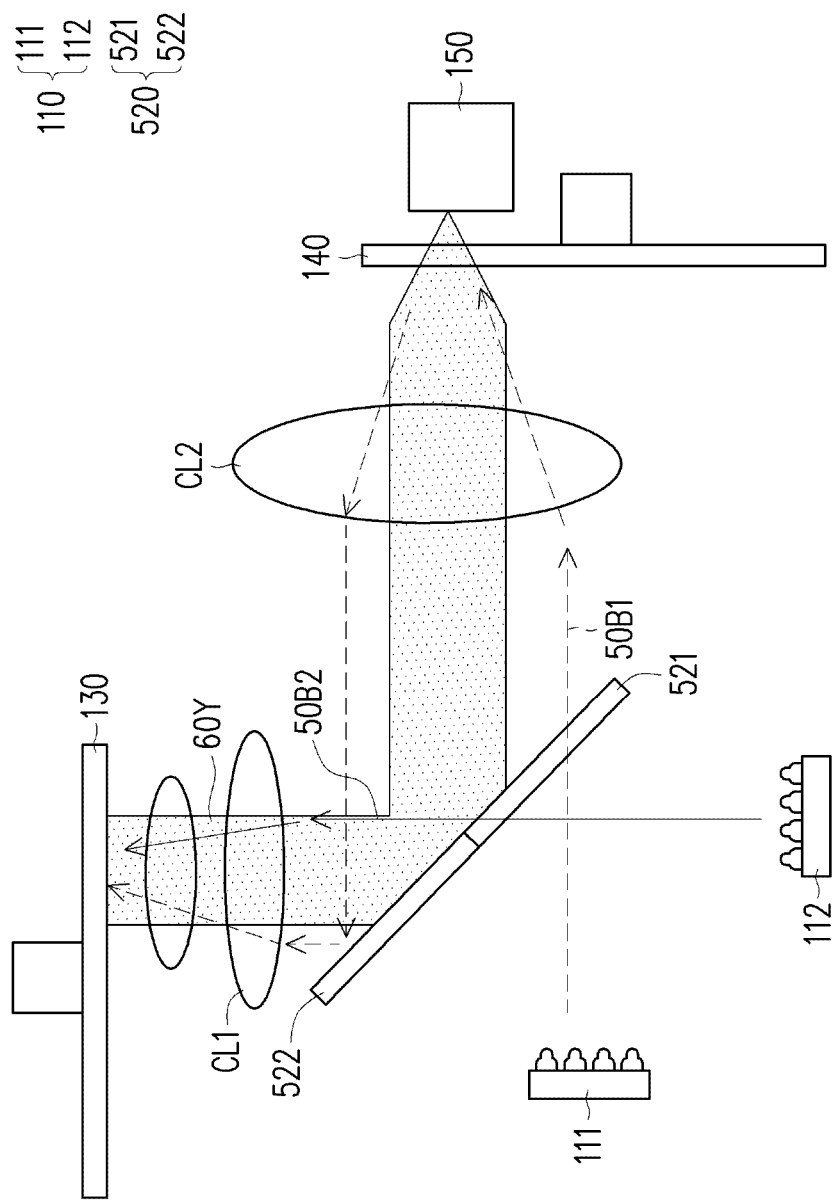
FIG. 5A is a schematic diagram of an optical path of yet another illumination system of FIG. 1 in a first period of time.
Figure 5B:
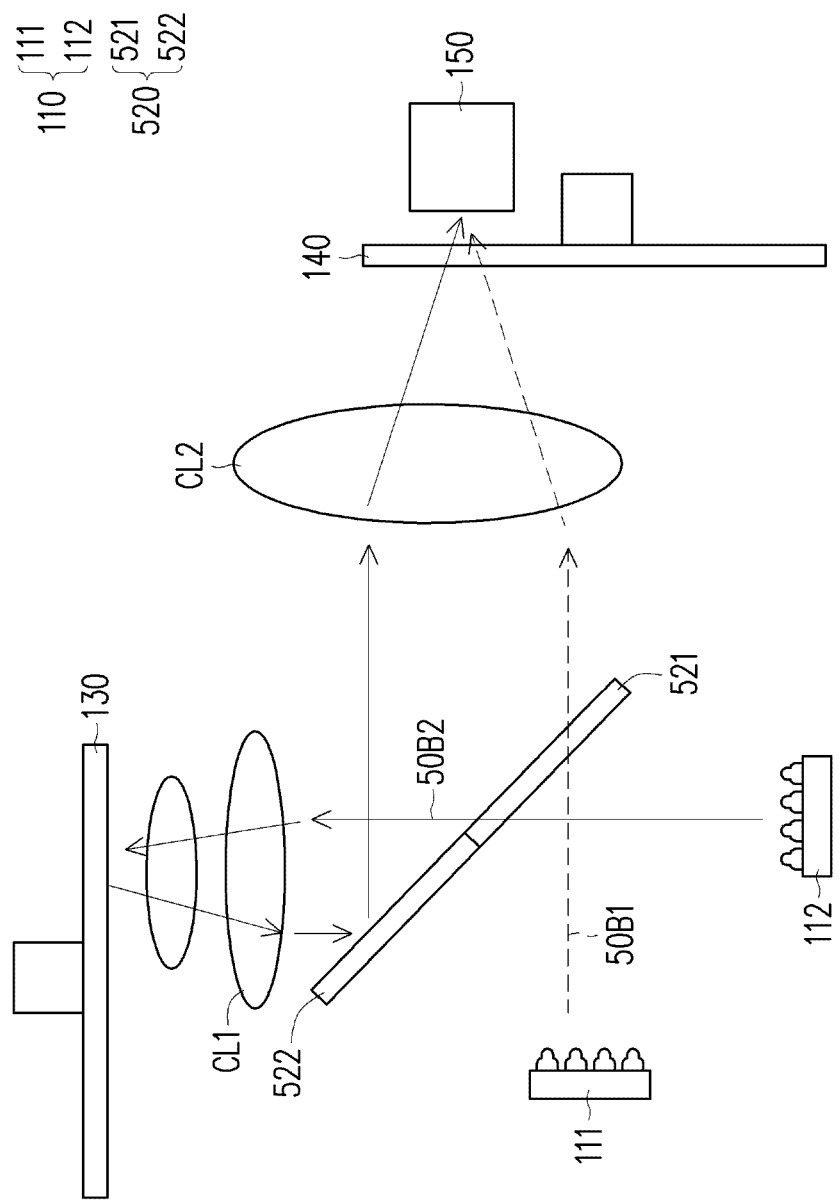
FIG. 5B is a schematic diagram of an optical path of an illumination system of FIG. 5A in a second period of time.

FIG. 5A is a schematic diagram of an optical path of yet another illumination system of FIG. 1 in a first period of time. FIG. 5B is a schematic diagram of an optical path of an illumination system of FIG. 5A in a second period of time. Referring to FIG. 5A and FIG. 5B, an illumination system 500 of FIG. 5A and FIG. 5B is similar to the illumination system 100 of FIG. 2A, and the difference is described below. In the embodiment, a first region 521 and a second region 522 of the light splitting element 520 may be respectively a first color separation region and a second color separation region, and may provide different optical effects for the first beam 50B1 and the second beam 50B2, respectively. For example, the first color separation region of the light splitting element 520 may be a dichroic mirror with yellow reflection, to reflect yellow light and allow blue light to penetrate. For example, in the embodiment, the first region 521 of the light splitting element 520 may reflect, for example, light of the light-emitting band of more than 470 nm, to allow light of the light-emitting band within a band range of less than 470 nm to penetrate. In addition, the second region 522 (that is, the second color separation region) of the light splitting element 520 may be configured with a reflection sheet, or a dichroic mirror with yellow reflection, to reflect yellow light.

Moreover, as shown in FIG. 5A and FIG. 5B, the first laser light source unit 111 and the second laser light source unit 112 are respectively located on a same side of the light splitting element 520. In this way, when the first beam 50B1 and the second beam 50B2 respectively exit from the first laser light source unit 111 and the second laser light source unit 112 and are incident to the light splitting element 520, the color separation region (first region 521) of the light splitting element 520 may allow the first beam 50B1 and the second beam 50B2 to penetrate, and allow the first beam 50B1 and the second beam 50B2 to be respectively transmitted to the filter module 140 and the wavelength conversion module 130 via the first region 521 (that is, the first color separation region). In addition, the second region 522 (that is, the second color separation region) of the light splitting element 520 may reflect the converted beam 60Y from the wavelength conversion module 130 to the filter module 140.

In more detail, as shown in FIG. 5A, in the first period of time, the first beam 50B1 is transmitted to the filter module 140 after being incident to and penetrating the first region 521 of the light splitting element 520, and then the first beam 50B1 is sequentially reflected by the filter module 140 and the second region 522 of the light splitting element 520, and then the first beam 50B1 is transmitted to the wavelength conversion module 130. Besides, the second beam 50B2 in the first period of time is incident to and penetrates the first region 521 of the light splitting element 520, and then the second beam 50B2 is transmitted to the wavelength conversion module 130. Furthermore, the converted beam 60Y formed in the first period of time may be transmitted to a first color filter region FR1 of the filter module 140 after being reflected via the first region 521 and the second region 522 of the light splitting element 520.

Besides, as shown in FIG. 5B, in the embodiment, the first beam 50B1 in the second period of time is transmitted to the filter module 140 after being incident to and penetrating the first region 521 of the light splitting element 520. The second beam 50B2 in the second period of time is transmitted to a non-conversion region NT of the wavelength conversion module 130 after being incident to and penetrating the first region 521 of the light splitting element 520, and then the second beam 50B2 is reflected to the second region 522 of the light splitting element 520, and is reflected to a second color filter region FR2 of the filter module 140.

In this way, in the embodiment, through disposing the first region 521 and the second region 522 of the light splitting element 520, the wavelength conversion module 130, and different color filter regions FR of the filter module 140, in the first period of time, the illumination system 500 may still allow the converted beam 60Y to form specific different colored light, and in the second period of time, allow the first beam 50B1 and the second beam 50B2 to form blue colored light, thereby forming an illumination beam 70 with different colors, so that similar effects and advantages of the illumination system 100 may be achieved, and the descriptions thereof are omitted herein.

In addition, when the illumination system 500 is applied to the projection device 200 of FIG. 1, through the optical path configuration in which the first beam 50B1 of the illumination system 500 in the first period of time is transmitted to the wavelength conversion module 130 via the filter module 140, the freedom of light source setting and the brightness of the system may be improved via the projection device 200, and the first beam may be symmetrically incident to the optical elements located on the transmission path thereof, so that the above effects and advantages may also be achieved via the projection device 200, and the descriptions thereof are omitted herein.

Figure 6A:
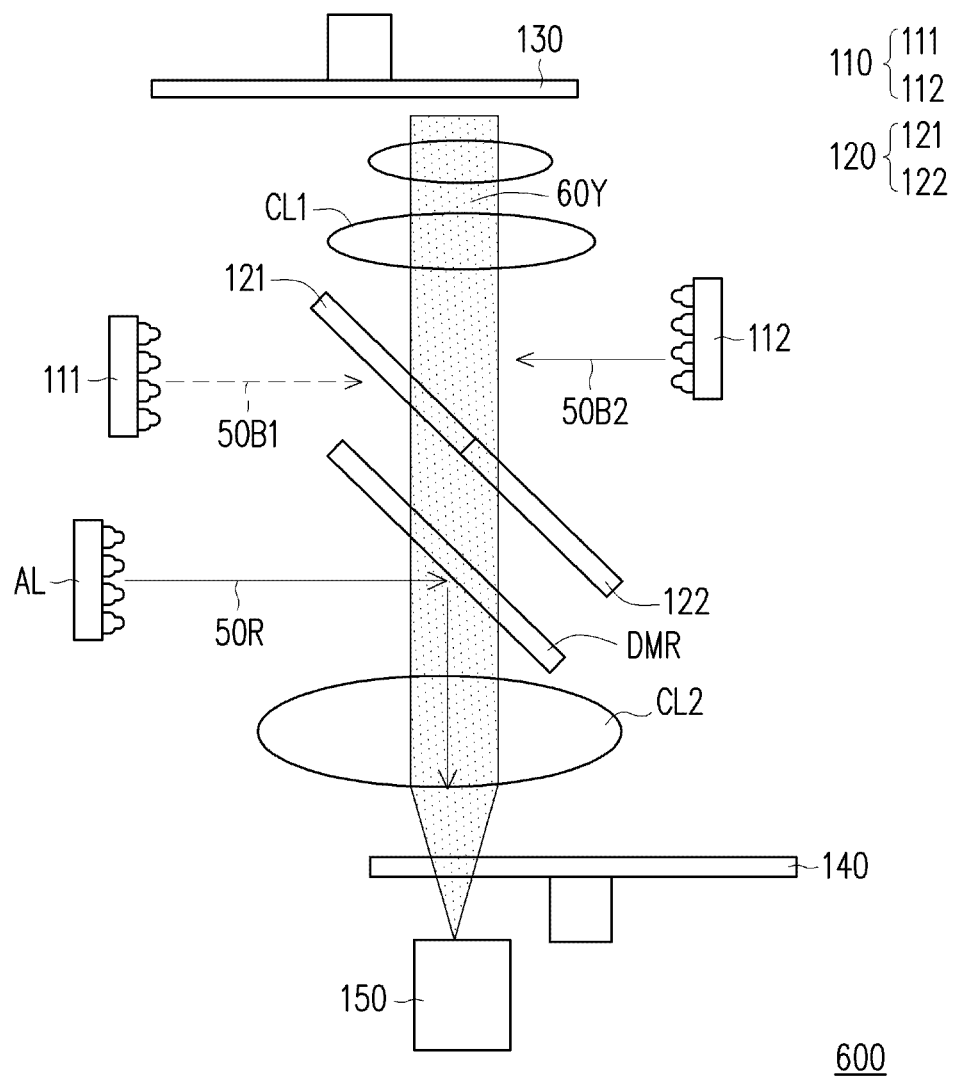
FIG. 6A is a schematic diagram of a configuration of yet another illumination system of FIG. 1.
Figure 6B:
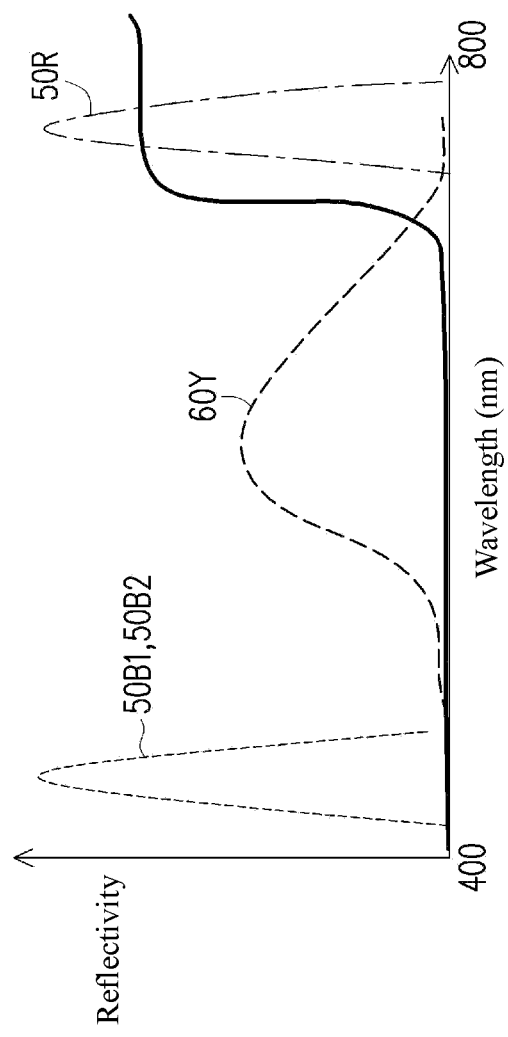
FIG. 6B is a graph showing a relationship between transmittance of a light splitting and combining element of FIG. 6A and light of different bands.

FIG. 6A is a schematic diagram of an architecture of yet another illumination system of FIG. 1. FIG. 6B is a graph showing a relationship between transmittance of a light splitting and combining element of FIG. 6A and light of different bands. Referring to FIG. 6A, an illumination system 600 of FIG. 6A is similar to the illumination system 100 of FIG. 2A, and the difference is described below. As shown in FIG. 6A, in the embodiment, the illumination system 600 further includes an auxiliary light source AL and a light splitting and combining element DMR. The auxiliary light source AL is configured to provide a third beam 50R in a third period of time. For example, in the embodiment, the auxiliary light source AL may be a red laser light source or a red light-emitting diode light source, and the third beam 50R is a red light beam. In addition, as shown in FIG. 6A and FIG. 6B, the light splitting and combining element DMR may be a dichroic mirror with red reflection to reflect red light and allow light other than red light to penetrate. For example, in the embodiment, the light splitting and combining element DMR may reflect, for example, light of the light-emitting band of more than 620 nm, to allow light of the light-emitting band within a band range of less than 620 nm to penetrate.

More specifically, as shown in FIG. 6A, in the embodiment, the light splitting and combining element DMR is located on a transmission path of the third beam 50R. When emitted from the auxiliary light source AL in the third period of time, the third beam 50R may penetrate the filter module 140 after being transmitted to a third color filter region FR3 of the filter module 140 via the splitting and combining light element DMR. The third color filter region FR3 may be a red light filter region located in the first color filter region FR1 of the filter module 140, or a red light filter region (not shown) additionally disposed outside the first color filter region FR1. With the configuration of the auxiliary light source AL, the illumination system 600 may increase the proportion of red light in the illumination beam 70 and improve red color performance of the projection picture.

Furthermore, in the embodiment, the transmission path of the first beam 50B1 is the same as the optical path of the first beam 50B1 in the embodiment of FIG. 2A, and the transmission path of the second beam 50B2 is the same as the optical path of the second beam 50B2 in the embodiment of FIG. 2A. For related details, reference is made to the foregoing descriptions, and the descriptions thereof are omitted herein.

In this way, in the embodiment, through disposing the first region 121 and the second region 122 of the light splitting element 120, the wavelength conversion module 130, and different color filter regions FR of the filter module 140, in the first period of time, the illumination system 600 may still allow the converted beam 60Y to form specific different colored light, and in the second period of time, allow the first beam 50B1 and the second beam 50B2 to form blue colored light, thereby forming an illumination beam 70 with different colors, so that similar effects and advantages of the illumination system 100 may be achieved, and the descriptions thereof are omitted herein. In addition, when the illumination system 600 is applied to the projection device 200 of FIG. 1, through the optical path configuration in which the first beam 50B1 of the illumination system 600 in the first period of time is transmitted to the wavelength conversion module 130 via the filter module 140, the freedom of light source setting and the brightness of the system may be improved via the projection device 200, and the first beam may be symmetrically incident to the optical elements located on the transmission path thereof, so that the above effects and advantages may also be achieved via the projection device 200, and the descriptions thereof are omitted herein.

Figure 7A:
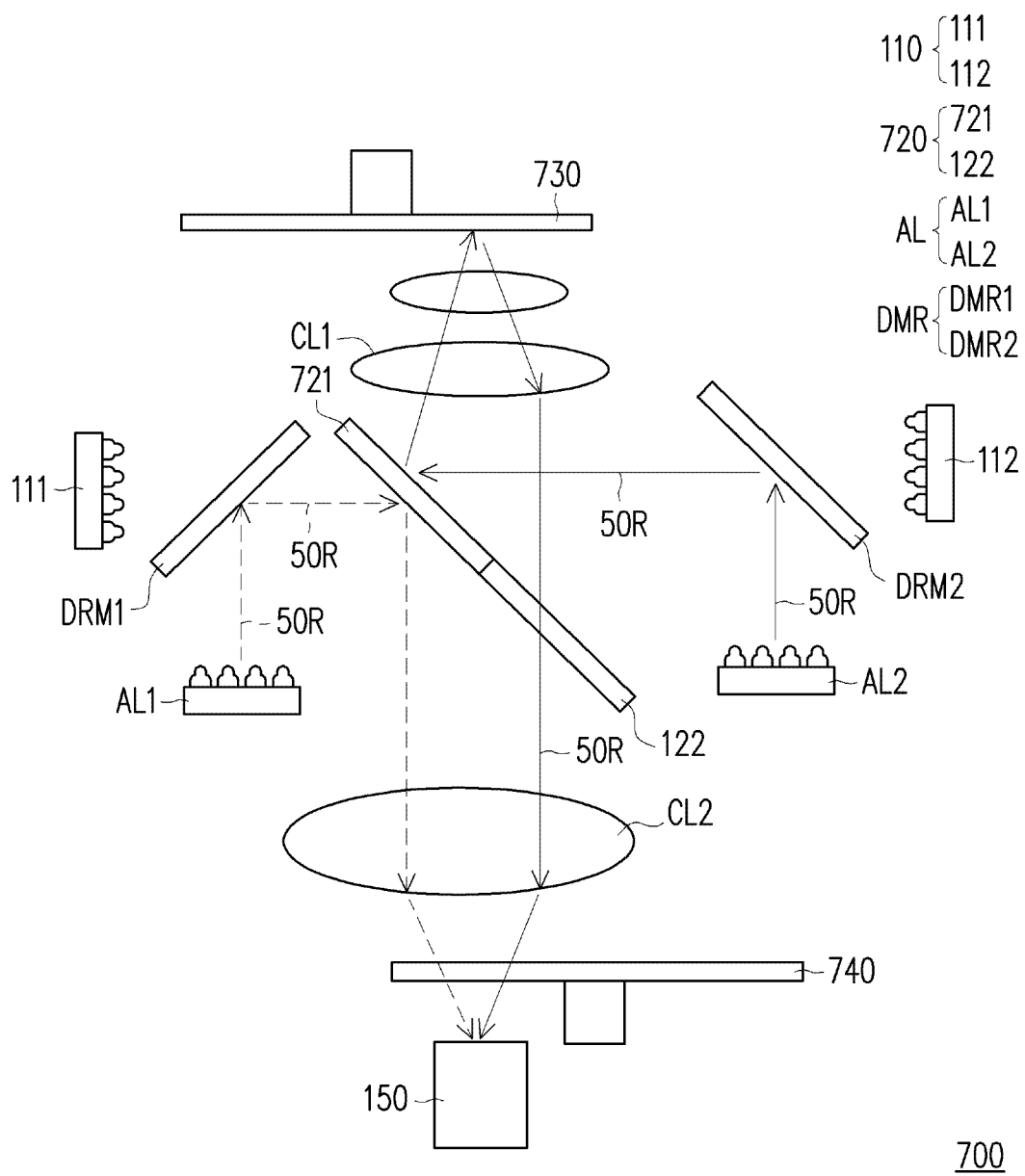
FIG. 7A is a schematic diagram of a configuration of yet another illumination system of FIG. 1 in a third period of time.
Figure 7B:
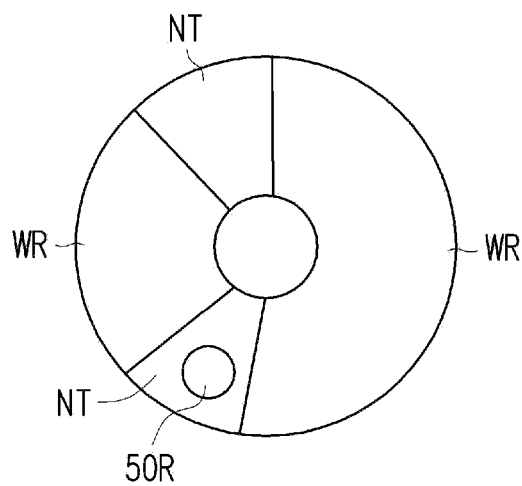
FIG. 7B is a top view of a wavelength conversion module of FIG. 7A.
Figure 7C:
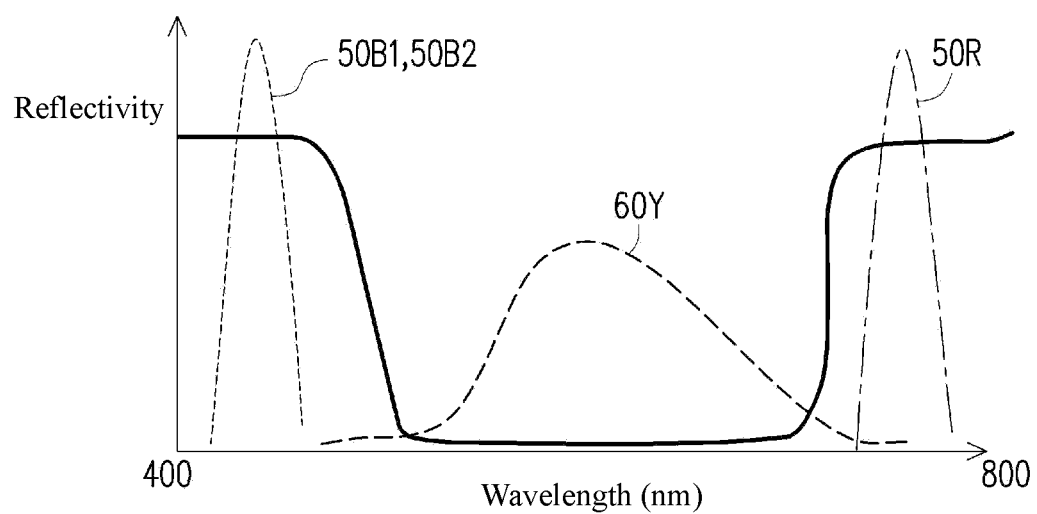
FIG. 7C is a graph showing a relationship between transmittance of a first region of a light splitting element of FIG. 7A and light of different bands.

FIG. 7A is a schematic diagram of an architecture of yet another illumination system of FIG. 1 in a third period of time. FIG. 7B is a top view of a wavelength conversion module of FIG. 7A. FIG. 7C is a graph showing a relationship between transmittance of a first region 721 of a light splitting element 720 of FIG. 7A and light of different bands. Referring to FIG. 7A, an illumination system 700 of FIG. 7A is similar to the illumination system 100 of FIG. 2A, and the difference is described below. As shown in FIG. 7A, in the embodiment, the illumination system 700 further includes an auxiliary light source AL and a light splitting and combining element DMR. Specifically, the auxiliary light source AL includes a first auxiliary light source AL1 and a second auxiliary light source AL2, which are respectively configured to provide a plurality of third beams 50R in a third period of time. The light splitting and combining element DMR includes a first light splitting and combining element DMR1 and a second light splitting and combining element DMR2, the first auxiliary light source AL1 and the first light splitting and combining element DMR1 are disposed corresponding to the first laser light source unit 111, and the second auxiliary light source AL2 and the second light splitting and combining element DMR2 are disposed corresponding to the second laser light source unit 112.

For example, in the embodiment, the first auxiliary light source AL1 and the second auxiliary light source AL2 are the same as the auxiliary light source AL in FIG. 6A, and the first light splitting and combining element DMR1 and the second light splitting and combining element DMR2 are the same as the light splitting and combining element DMR in FIG. 6A, and the descriptions thereof are omitted herein. In addition, in the embodiment, the first region 721 of the light splitting element 720 of FIG. 7A has similar optical effects to the first region 121 of the light splitting element 120 of FIG. 2A, and the differences are described below. For example, the first region 721 of the light splitting element 720 may be a dichroic mirror with blue reflection and red reflection, to reflect blue light and red light and allow light other than blue light and red light to penetrate. The relationship between the transmittance of the first region 721 of the light splitting element 720 and light of different bands is shown in FIG. 7C.

In this way, as shown in FIG. 7A and FIG. 7B, in the embodiment, in the third period of time, the third beam 50R provided by the first auxiliary light source AL1 is transmitted to the filter module 740 via the first light splitting and combining element DMR1 and the light splitting element 720, and the third beam 50R provided by the second auxiliary light source AL2 is reflected to the light splitting element 720 after being transmitted to the non-conversion region NT of the wavelength conversion module 730 sequentially via the second light splitting and combining element DMR2 and the light splitting element 720, and then is transmitted to the filter module 740 via the light splitting element 720, and the third beam 50R provided by the first auxiliary light source AL1 and the third beam 50R provided by the second auxiliary light source AL2 penetrate the filter module 740 via the third color filter region FR3. Furthermore, in the embodiment, the transmission paths of the first beam 50B1 provided by the first laser light source unit 111 in the first period of time and the second period of time are the same as the optical path of the first beam 50B1 in the embodiment of FIG. 2A, and the transmission paths of the second beam 50B2 provided by the second laser light source unit 112 in the first period of time and the second period of time are the same as the optical path of the second beam 50B2 in the embodiment of FIG. 2A. For related details, reference is made to the foregoing descriptions, and the descriptions thereof are omitted herein.

In this way, since the third beam 50R provided by the second auxiliary light source AL2 needs to be incident to the wavelength conversion module 730, when the illumination system 700 is applied to the projection device 200 of FIG. 1, since the projection device 200 is a single light valve system, a red light non-conversion region NT has to be added independently in the wavelength conversion module 730 (as shown in FIG. 7B), and the third color filter region FR3 of the filter module 740 is also a red light filter region (not shown) added independently from the first color filter region FR1 of the filter module 740.

As a result, with the symmetrical configuration of a plurality of auxiliary light sources, the illumination system 700 may increase the proportion of red light in the illumination beam 70, and may also be symmetrically incident to the light homogenization element 150, so that the red color performance of the projection picture may be improved more greatly. In addition, in the embodiment, through disposing the first region 721 and the second region 122 of the light splitting element 720, the wavelength conversion module 730, and different color filter regions FR of the filter module 740, in the first period of time, the illumination system 700 may still allow the converted beam 60Y to form specific different colored light, and in the second period of time, allow the first beam 50B1 and the second beam 50B2 to form blue colored light, thereby forming an illumination beam 70 with different colors, so that similar effects and advantages of the illumination system 100 may be achieved, and the descriptions thereof are omitted herein.

In addition, when the illumination system 700 is applied to the projection device 200 of FIG. 1, through the optical path configuration in which the first beam 50B1 of the illumination system 700 in the first period of time is transmitted to the wavelength conversion module 730 via the filter module 740, the freedom of light source setting and the brightness of the system may be improved via the projection device 200, and the first beam may be symmetrically incident to the optical elements located on the transmission path thereof, so that the above effects and advantages may also be achieved via the projection device 200, and the descriptions thereof are omitted herein.

Figure 8:
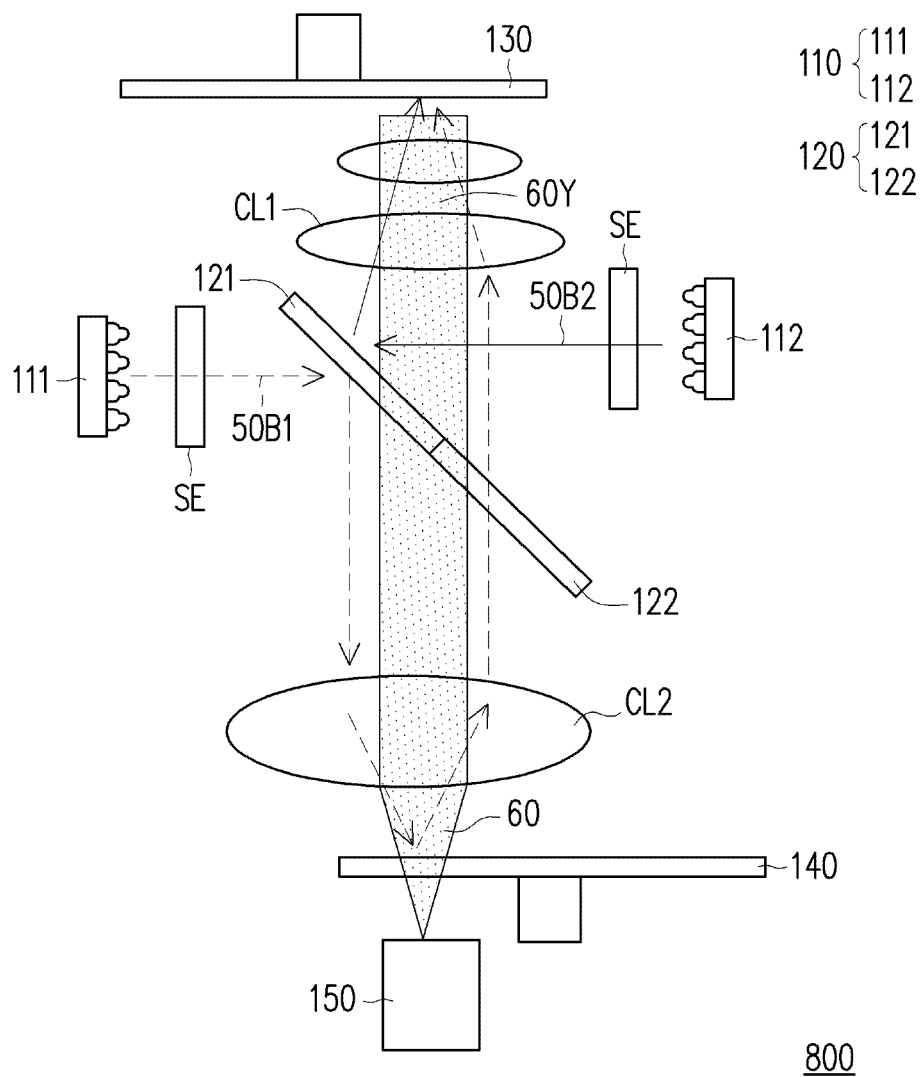
FIG. 8 and FIG. 9 are schematic diagrams of configurations of different illumination systems of FIG. 1.
Figure 9:
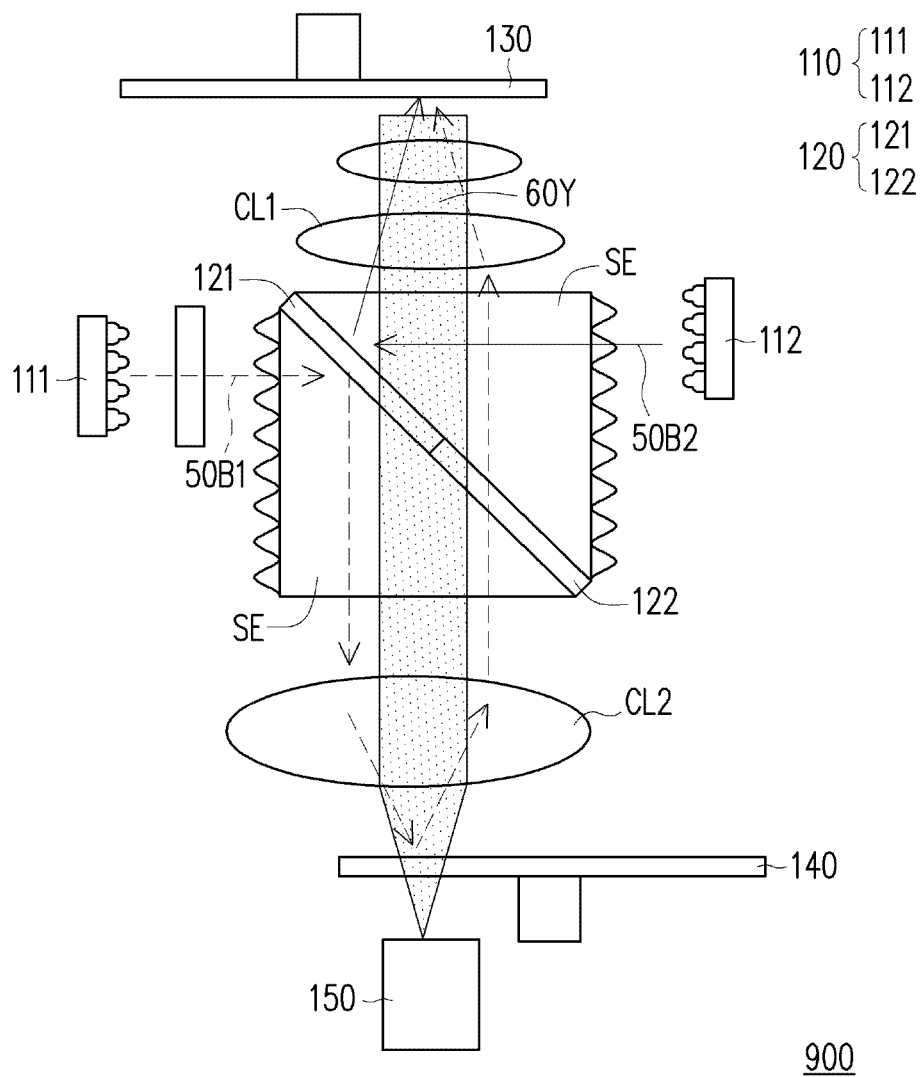

FIG. 8 and FIG. 9 are schematic diagrams of configurations of different illumination systems of FIG. 1. Referring to FIG. 8 and FIG. 9, illumination systems 800 and 900 of FIG. 8 and FIG. 9 are similar to the illumination system 100 of FIG. 2A, and the difference is described below. As shown in FIG. 8 and FIG. 9, in the embodiments of FIG. 8 and FIG. 9, the illumination systems 800 and 900 further respectively include a plurality of light spot shaping elements SE. Each of the light spot shaping elements SE is correspondingly disposed between each of the laser light source units and the light splitting element 120, and may be configured to shape light spots of the first beam 50B1 and the second beam 50B2, thereby improving the conversion efficiency of the wavelength conversion module 130. For example, as shown in FIG. 8, the light spot shaping elements SE may be a Flyeye lens array, a top-hat diffuser, or an integration rod. Alternatively, as shown in FIG. 9, a prism having a microstructure is provided with a microstructure at a side facing the light source to shape the light spot. Furthermore, in the embodiment, the transmission path of the first beam 50B1 is the same as the optical path of the first beam 50B1 in the embodiment of FIG. 2A, and the transmission path of the second beam 50B2 is the same as the optical path of the second beam 50B2 in the embodiment of FIG. 2A. For related details, reference is made to the foregoing descriptions, and the descriptions thereof are omitted herein.

In this way, in the embodiments of FIG. 8 and FIG. 9, through disposing the first region 121 and the second region 122 of the light splitting element 120, the wavelength conversion module 130, and different color filter regions FR of the filter module 140, in the first period of time, the illumination systems 800 and 900 may still allow the converted beam 60Y to form specific different colored light, and in the second period of time, allow the first beam 50B1 and the second beam 50B2 to form blue colored light, thereby forming an illumination beam 70 with different colors, so that similar effects and advantages of the above illumination system 100 may be achieved, and the descriptions thereof are omitted herein.

In addition, when the illumination systems 800 and 900 are applied to the projection device 200 of FIG. 1, through the optical path configuration in which the first beam 50B1 of the illumination system 800 or 900 in the first period of time is transmitted to the wavelength conversion module 130 via the filter module 140, the freedom of light source setting and the brightness of the system may also be improved via the projection device 200, and the first beam may be symmetrically incident to the optical elements located on the transmission path thereof, so that the above effects and advantages may also be achieved via the projection device 200, and the descriptions thereof are omitted herein.

Based on the above, the embodiments of the invention have at least one of the following advantages or effects. In the embodiments of the invention, the freedom of light source setting may be improved via the projection device and the illumination system through the optical path configuration in which the first beam in the first period of time is transmitted to the wavelength conversion module via the filter module. In this way, both number of light sources in the illumination system may be increased, so that the brightness of the system is improved, which is conducive to application in the model of the projection device with high brightness requirements. Moreover, under the above configuration, the first beam and the second beam may be symmetrically incident to the optical elements located on the transmission paths thereof without disposing additional optical elements, thereby improving the optical efficiency of the projection device and the illumination system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising: a plurality of laser light source units, a light splitting element, a wavelength conversion module, and a filter module, wherein
   the plurality of laser light source units comprise a first laser light source unit and a second laser light source unit, wherein
      the first laser light source unit is configured to provide a first beam; and
      the second laser light source unit is configured to provide a second beam;
   the light splitting element is located on transmission paths of the first beam and the second beam;
   the wavelength conversion module has a wavelength conversion region and a non-conversion region and is configured to rotate, so that the wavelength conversion region cuts into the transmission paths of the first beam and the second beam in a first period of time, and the non-conversion region cuts into the transmission path of the second beam in a second period of time; and
   the filter module is configured to rotate and has a plurality of color filter regions, wherein when the wavelength conversion module rotates synchronously with the filter module, in the first period of time, the first beam is then reflected to the wavelength conversion region of the wavelength conversion module via a first color filter region of the plurality of color separation filter regions after being transmitted to the filter module via the light splitting element, the second beam is transmitted to the wavelength conversion region of the wavelength conversion module via the light splitting element, the first beam and the second beam are converted into a converted beam via the wavelength conversion region, and the converted beam is transmitted to the filter module via the light splitting element.

2. The illumination system according to claim 1, wherein when the wavelength conversion module rotates synchronously with the filter module, in the second period of time, the first beam is transmitted to the filter module via the light splitting element, the second beam is reflected to the light splitting element after being transmitted to the non-conversion region of the wavelength conversion module via the light splitting element, and is then transmitted to the filter module via the light splitting element, and the first beam and the second beam penetrate the filter module via a second color filter region of the plurality of color filter regions.

3. The illumination system according to claim 2, further comprising:
   a first condenser lens, located between the light splitting element and the wavelength conversion module, wherein the first beam and the second beam are transmitted to the wavelength conversion module after being symmetrically incident to the first condenser lens respectively from two sides of a central axis of the first condenser lens in the first period of time.

4. The illumination system according to claim 2, further comprising:
a second condenser lens, located between the light splitting element and the filter module, wherein the first beam and the second beam are transmitted to the filter module after being symmetrically incident to the second condenser lens respectively from two sides of a central axis of the second condenser lens in the second period of time.

5. The illumination system according to claim 2, wherein the light splitting element has a first region and a second region;
in the first period of time, the first beam is incident to the first region of the light splitting element and reflected to the filter module, and the first beam penetrates the second region of the light splitting element after being reflected via the filter module, and is transmitted to the wavelength conversion module;
in the first period of time, the second beam is incident to the first region of the light splitting element and reflected to the wavelength conversion module; and
in the first period of time, the converted beam penetrates the first region and the second region of the light splitting element and is transmitted to the filter module.

6. The illumination system according to claim 5, wherein
in the second period of time, the first beam is incident to the first region of the light splitting element and reflected to the filter module; and
in the second period of time, the second beam is incident to the first region of the light splitting element and reflected to the non-conversion region of the wavelength conversion module, then the second beam penetrates the second region of the light splitting element after being reflected via the wavelength conversion module, and the second beam is transmitted to the filter module.

7. The illumination system according to claim 5, wherein the first laser light source unit and the second laser light source unit are respectively located on two sides of the light splitting element.

8. The illumination system according to claim 5, further comprising a light transmission module, wherein the light transmission module is located on the transmission path of the first beam, in the first period of time and the second period of time, the first beam is incident to and penetrates the second region of the light splitting element, and then the first beam is transmitted to the light transmission module, and the first beam is then transmitted and incident to the first region of the light splitting element via the light transmission module.

9. The illumination system according to claim 8, wherein the first laser light source unit and the light transmission module are respectively located on two sides of the light splitting element.

10. The illumination system according to claim 8, wherein the first laser light source unit and the second laser light source unit are respectively located on a same side of the light splitting element.

11. The illumination system according to claim 2, wherein the light splitting element has a first region and a second region;
in the first period of time, the first beam is transmitted to the filter module after penetrating the first region of the light splitting element, and then the first beam is transmitted to the wavelength conversion module after being reflected by the filter module and the second region of the light splitting element sequentially;
in the first period of time, the second beam is incident to and penetrates the first region of the light splitting element, and is transmitted to the wavelength conversion module; and
in the first period of time, the converted beam is transmitted to the filter module after being reflected via the first region and the second region of the light splitting element.

12. The illumination system according to claim 11, wherein
in the second period of time, the first beam is transmitted to the filter module after being incident to and penetrating the first region of the light splitting element; and
in the second period of time, the second beam is transmitted to the non-conversion region of the wavelength conversion module after being incident to and penetrating the first region of the light splitting element, and the second beam is then reflected to the second region of the light splitting element, and then is reflected to the filter module.

13. The illumination system according to claim 12, wherein the first laser light source unit and the second laser light source unit are respectively located on a same side of the light splitting element.

14. The illumination system according to claim 1, wherein there are a plurality of first laser light source units and a plurality of second laser light source units, and the light splitting element has a plurality of first regions and a plurality of second regions arranged alternatively with each other, wherein any one of the second regions is located between adjacent two of the first regions, and the plurality of first regions are respectively disposed corresponding to positions of the first laser light source units and the second laser light source units.

15. The illumination system according to claim 1, further comprising:
an auxiliary light source, configured to provide a third beam; and
a light splitting and combining element, located on a transmission path of the third beam, wherein the third beam penetrates the filter module after being transmitted to a third color filter region of the filter module via the light splitting and combining element in a third period of time.

16. The illumination system according to claim 15, wherein the auxiliary light source comprises a first auxiliary light source and a second auxiliary light source, respectively configured to provide a plurality of third beams, the light splitting and combining element comprises a first light splitting and combining element and a second light splitting and combining element, the first auxiliary light source and the first light splitting and combining element are disposed corresponding to the first laser light source unit, and the second auxiliary light source and the second light splitting and combining element are disposed corresponding to the second laser light source unit.

17. The illumination system according to claim 16, wherein in the third period of time, the third beam provided by the first auxiliary light source is transmitted to the filter module via the first light splitting and combining element and the light splitting element, the third beam provided by the second auxiliary light source is reflected to the light splitting element after being transmitted to the non-conversion region of the wavelength conversion module via the second light splitting and combining element and the light splitting element, and is then transmitted to the filter module via the light splitting element, and the third beam provided by the first auxiliary light source and the third beam provided by the second auxiliary light source penetrate the filter module via the third color filter region.

18. The illumination system according to claim 1, further comprising:
- a plurality of light spot shaping elements, wherein each of the light spot shaping elements is correspondingly disposed between each of the laser light source units and the light splitting element.

19. A projection device, comprising: an illumination system, a light valve, and a projection lens, wherein
- the illumination system is configured to provide an illumination beam and comprises a plurality of laser light source units, a light splitting element, a wavelength conversion module, and a filter module, wherein
  - the plurality of laser light source units comprise a first laser light source unit and a second laser light source unit, wherein
    - the first laser light source unit is configured to provide a first beam; and
    - the second laser light source unit is configured to provide a second beam;
  - the light splitting element is located on transmission paths of the first beam and the second beam;
  - the wavelength conversion module has a wavelength conversion region and a non-conversion region and is configured to rotate, so that the wavelength conversion region cuts into the transmission paths of the first beam and the second beam in a first period of time, and the non-conversion region cuts into the transmission path of the second beam in a second period of time; and
  - the filter module is configured to rotate and has a plurality of color filter regions, wherein when the wavelength conversion module rotates synchronously with the filter module, in the first period of time, the first beam is transmitted to the filter module via the light splitting element, and is then reflected to the wavelength conversion region of the wavelength conversion module via a first color filter region of the plurality of color filter regions, the second beam is transmitted to the wavelength conversion region of the wavelength conversion module via the light splitting element, the first beam and the second beam are converted to a converted beam via the wavelength conversion region, the converted beam is transmitted to the filter module via the light splitting element, and the illumination beam comprises the first beam, the second beam, and the converted beam;
- the light valve is located on a transmission path of the illumination beam, and is configured to convert the illumination beam into an image beam; and
- the projection lens is located on a transmission path of the image beam, and is configured to project the image beam out of the projection device.

20. The projection device according to claim 19, wherein when the wavelength conversion module rotates synchronously with the filter module, in the second period of time, the first beam is transmitted to the filter module via the light splitting element, the second beam is reflected to the light splitting element after being transmitted to the non-conversion region of the wavelength conversion module via the light splitting element, and is then transmitted to the filter module via the light splitting element, and the first beam and the second beam penetrate the filter module via a second color filter region of the plurality of color filter regions.

* * * * *